(12) United States Patent
Hung et al.

(10) Patent No.: US 6,716,265 B2
(45) Date of Patent: Apr. 6, 2004

(54) AIR TREATMENT APPARATUS WITH AN INTERCHANGEABLE VENT COVER

(75) Inventors: Chien-Chang Hung, Pingtung (TW); Hsu-Cheng Chiang, Hsinchu (TW); Chung-Shu Pan, Taipei (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 2 days.

(21) Appl. No.: 10/117,470

(22) Filed: Apr. 5, 2002

(65) Prior Publication Data

US 2003/0121240 A1 Jul. 3, 2003

(30) Foreign Application Priority Data

Dec. 27, 2001 (TW) ........................................ 90223162 U

(51) Int. Cl.⁷ .............................................. B01D 46/00
(52) U.S. Cl. ........................... 55/473; 55/493; 55/495; 55/504; 55/511; 55/482; 55/508; 454/158; 454/139; 454/161
(58) Field of Search ........................ 55/473, 493, 495, 55/504, 511, 482, 508; 454/158, 139, 161

(56) References Cited

U.S. PATENT DOCUMENTS

| 5,762,667 | A | * | 6/1998 | Pippel et al. | 55/473 |
| 6,214,071 | B1 | * | 4/2001 | Wang | 55/385.1 |
| 6,217,439 | B1 | * | 4/2001 | Janeling et al. | 55/471 |
| 6,284,011 | B1 | * | 9/2001 | Chiang et al. | 55/471 |
| 6,421,238 | B1 | * | 7/2002 | Negishi | 55/471 |
| 6,487,075 | B2 | * | 11/2002 | Negishi | 55/471 |

* cited by examiner

Primary Examiner—Minh-Chau T. Pham
(74) Attorney, Agent, or Firm—Pearne & Gordon LLP

(57) ABSTRACT

An air treatment apparatus has a housing and a vent cover. The housing has a treatment element, at least one entrance and a fan secured in the hollow housing and facing the entrance. The vent cover is detachably and replaceably attached to the housing. At least one vent is selectively defined in one of the top face and the front face of the vent cover. With such an air treatment apparatus, the vent cover can be interchanged between a jet-flow one or a laminar-flow one.

16 Claims, 7 Drawing Sheets

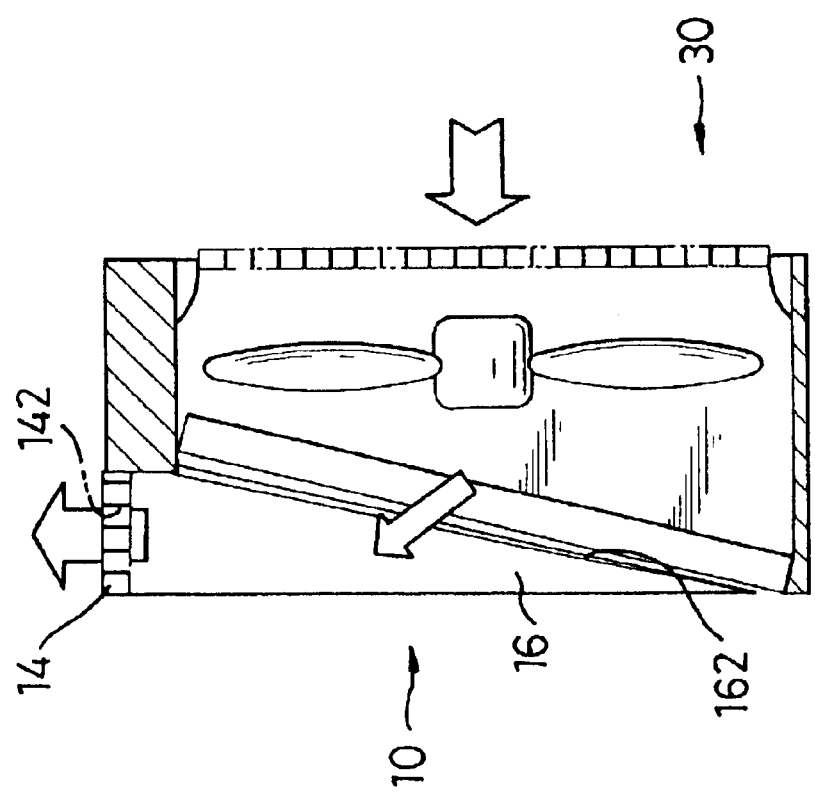

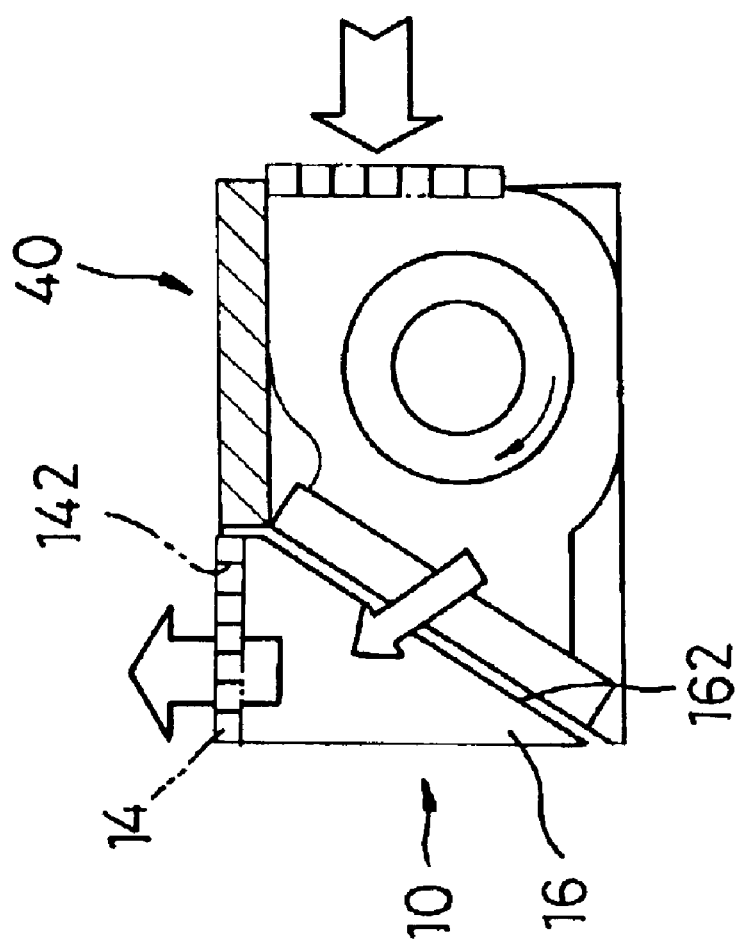

AIR TREATMENT APPARATUS WITH AN INTERCHANGEABLE VENT COVER

BACKGROUND OF THE INVENTION

1. Field of the Invention

The present invention relates to an air treatment apparatus, and more particularly to an air treatment apparatus with an interchangeable vent cover for a jet-flow or a laminar-flow.

2. Description of Related Art

An air treatment apparatus such as an air conditioner, an air drier, an air cleaner or the like is used to change the condition of the air in a specific space. A conventional air treatment apparatus substantially comprises a housing, a fan, a treatment element and a vent cover. At least one entrance is defined in the housing. The fan is mounted in the housing and faces the entrances, such that the air can be led into the housing by the fan through the entrances. The treatment element is mounted in the housing to change the condition of the air. The treatment element can be a heat exchanger, a drier or a filter. The vent cover is secured to the housing and has multiple vents defined in the cover for the treated air to be dispersed from the housing through vents. With reference to FIG. 9, a conventional vent cover (60) in accordance with the prior art has multiple vents (62) defined in a top of the vent cover (60). Each vent (62) in the top of the vent cover (60) has a width much smaller than a length of the vent (62). The speed of the air diffused from the narrow vents (62) is very high, and the distance of the air diffused from the vents (62) is thus very far. The airflow diffused from the narrow vents (62) is a jet flow. The jet-flow vent cover (60) is always used on an air treatment apparatus for treating the air in a large space due to the good dispersal effect created thereby.

With reference to FIG. 10, another conventional vent cover (70) in accordance with the prior art has multiple wide vents (72) defined in a front of the vent cover (70). Consequently, the speed of the air diffused from the wide vents (72) is slow. The airflow diffused from the wide vents (72) is a laminar flow. The laminar-flow vent cover (70) is used on an air treatment apparatus for treating the air in a specific rather than general area.

However, the conventional vent covers (60,70) in FIGS. 9 and 10 are secured on the housing of the air treatment apparatus and the conventional ones are not interchangeable. This means that if an air treatment apparatus is designed to be fitted with the jet-flow vent cover (60) as shown in FIG. 9, the air treatment apparatus cannot be fitted with the laminar-flow vent cover (70) as shown in FIG. 10. If a user wants to change the conditions of the air in a large area and in a specific area simultaneously, two different types of air treatment apparatuses respectively with a jet-flow vent cover (60) and a laminar-flow vent cover (70) must be bought. This duplication of equipment is an excessive financial burden for a consumer and thus it is likely that an apparatus with only one type of vent cover will be bought, thereby leading to inappropriate air quality at certain times.

To overcome the shortcomings, the present invention tends to provide an air treatment apparatus to mitigate or obviate the aforementioned problems.

SUMMARY OF THE INVENTION

The main objective of the invention is to provide an air treatment apparatus with an interchangeable vent cover such that a jet-flow condition and a laminar-flow condition are possible with the same apparatus. To achieve the above objective, the air treatment apparatus has a housing and a vent cover. The housing has a treatment element, at least one entrance and a fan secured in the housing and facing the entrances. The vent cover is detachably and replaceably attached to the housing. At least one vent is selectively defined in either of the top face and the front face of the vent cover.

Other objects, advantages and novel features of the invention will become more apparent from the following detailed description when taken in conjunction with the accompanying drawings.

BRIEF DESCRIPTION OF THE DRAWINGS

FIG. 6 is a side plan view of a second embodiment of an air treatment apparatus with the jet-flow vent cover in FIG. 2;

FIG. 8 is a side plan view of a third embodiment of an air treatment apparatus with the jet-flow vent cover in FIG. 2;

DETAILED DESCRIPTION OF PREFERRED EMBODIMENT

Figure 2:
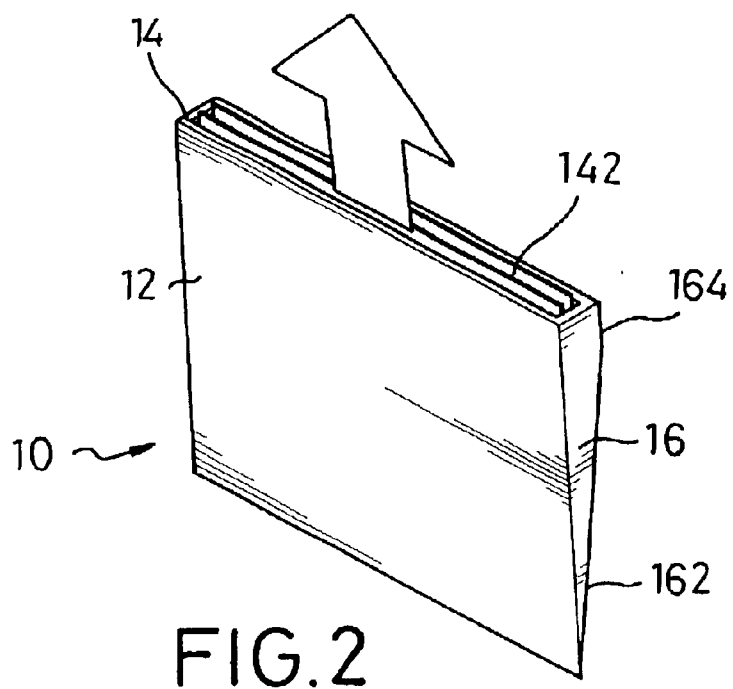
FIG. 2 is a perspective view of a jet-flow of a vent cover in accordance with the present invention.
Figure 1:
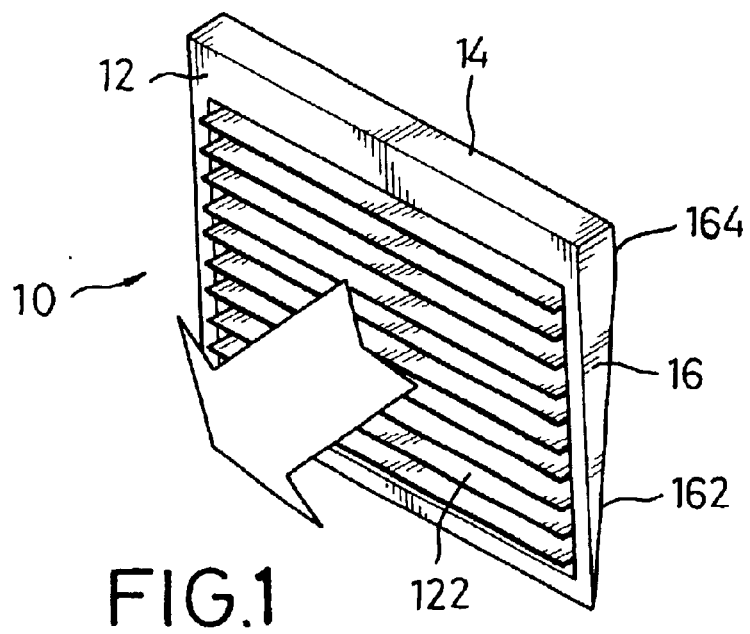
FIG. 1 is a perspective view of a laminar-flow vent cover in accordance with the present invention.

With reference to FIGS. 1 and 2, a vent cover (10) in accordance with the present invention comprises a front face (12), a top face (14) and two side faces (16). The top face (14) vertically extends from the top of the front face (12). Each side face (16) vertically extends from one of opposite sides of the front face (12). With reference to FIG. 1, at least one vent (122) is defined in the front face (12) of the vent cover (10). Each vent (122) defined in the front face (12) has an enlarged opening, such that the vent cover (10) is formed as a laminar-flow vent cover. In another embodiment, with reference to FIG. 2, at least one vent (142) is defined in the top face (14) of the vent cover (10). Each vent (142) defined in the top face (14) has a width much smaller than a length of each vent (142), such that the vent cover (10) is formed as a jet-flow vent cover. An inclined edge (162) is formed on the free end of each side face (16) of the vent cover (10). A vertical edge (164) is formed on the free end of each side face (16) of the vent cover (10) and above the inclined edge (162).

Figure 3:
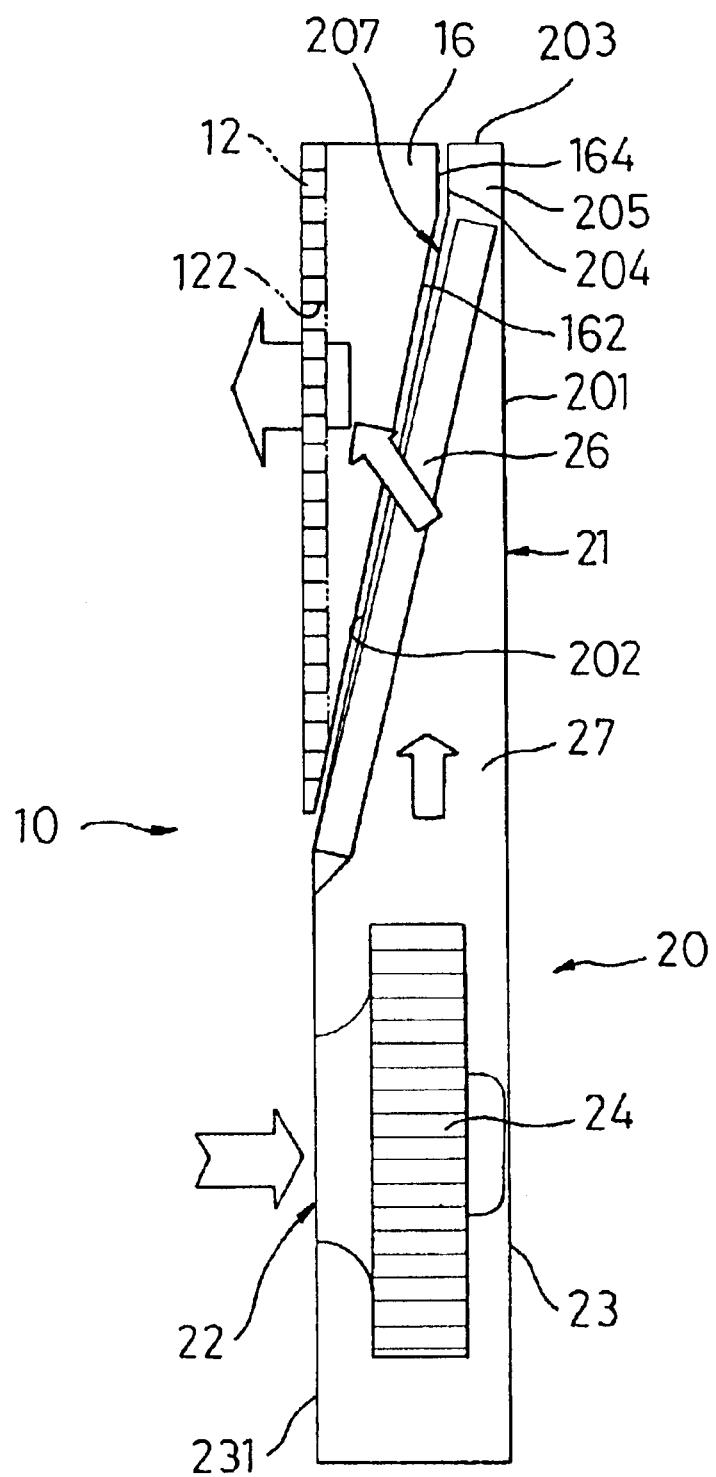
FIG. 3 is a side plan view of a first embodiment of an air treatment apparatus with the laminar-flow vent cover in FIG. 1.
Figure 4:
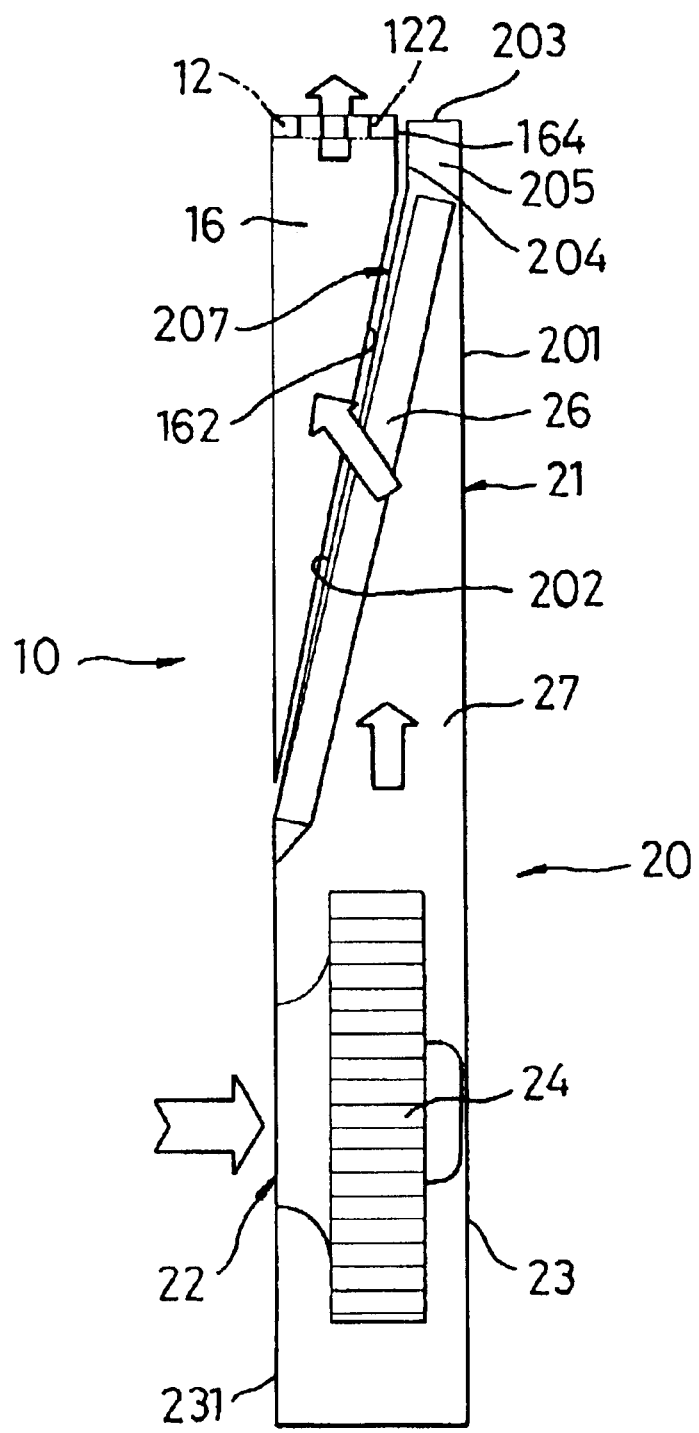
FIG. 4 is a side plan view of a first embodiment of an air treatment apparatus with the jet-flow vent cover in FIG. 2.
Figure 7:
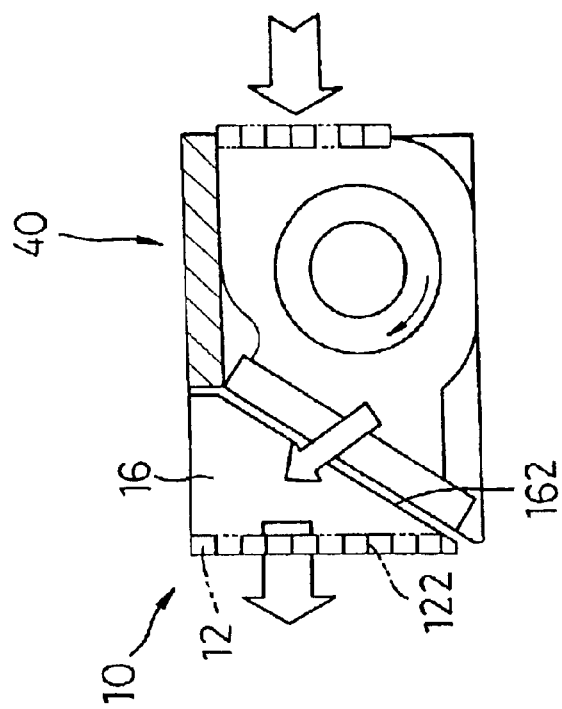
FIG. 7 is a side plan view of a third embodiment of an air treatment apparatus with the laminar-flow vent cover in FIG. 1.
Figure 5:
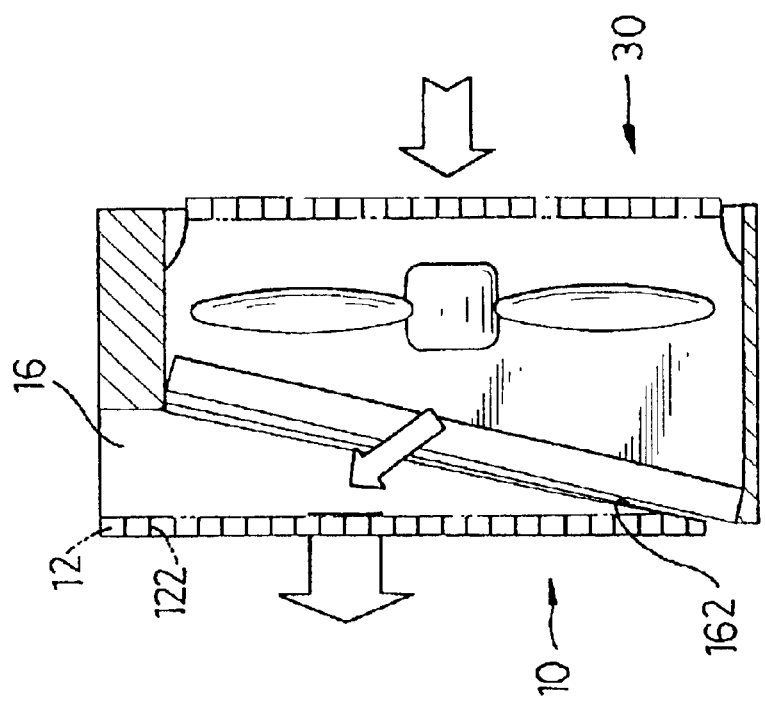
FIG. 5 is a side plan view of a second embodiment of an air treatment apparatus with the laminar-flow vent cover in FIG. 1.
Figure 9:
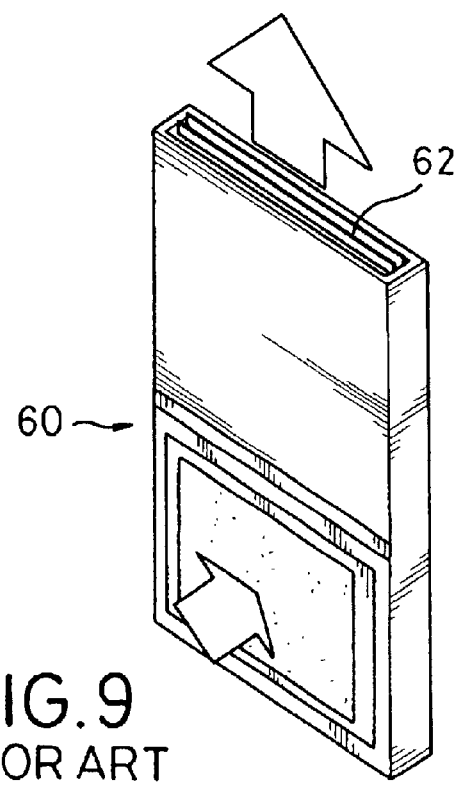
FIG. 9 is a perspective view of a conventional jet-flow vent cover in accordance with the prior art.
Figure 10:
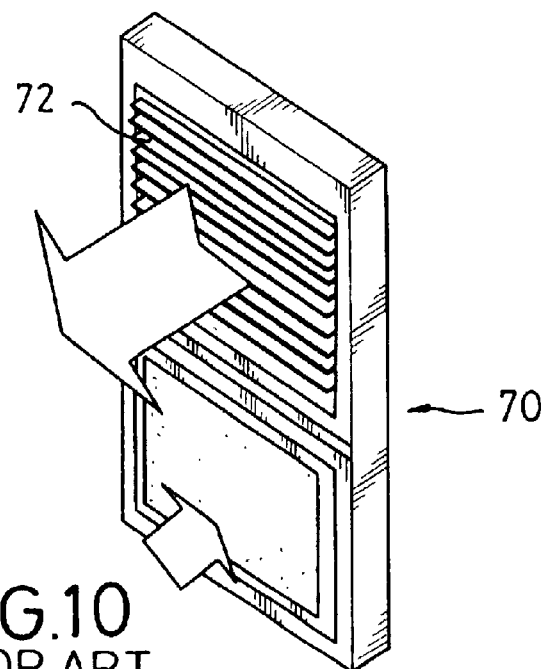
FIG. 10 is a perspective view of a conventional laminar-flow vent cover in accordance with the prior art.

With reference to FIGS. 3 and 4, an air treatment apparatus (20) in accordance with the present invention comprises a housing and a vent cover (10). The vent cover (10) is detachably and replaceably attached to the housing with a fastening means. The fastening means can be bolts, hooks and recesses or the like. The vent cover (10) comprises the front face (12), the top face (14) and the two side faces (16) as shown in FIGS. 1 and 2. The housing has an upper segment (21) and a lower segment (23). The upper segment (21) has a rear plate (201), a top plate (203) and two side plates (205). The top plate (203) vertically extends from the top of the rear plate (201). Each side plate (205) vertically extends from one of opposite sides of the rear plate (201), such that an opening (207) is defined between the rear plate (201), the top plate (203) and the side plates (205). A treatment element (26) is received in the opening (207) in the upper segment (21) to change the condition of the air, and the vent cover (10) is attached in the opening (207). The treatment element (26) can be a heat exchanger, a drier or a filter.

An inclined edge (202) is formed on the free end of each side plate (205) of the housing and corresponds to the inclined edge (162) on one of the side faces (16) of the vent cover (10). A vertical edge (204) is formed on the free end of each side plate (205) of the housing and corresponds to the vertical edge (164) on one of the side faces (16) of the vent cover (10). In addition, a pad is mounted between the side faces (16) of the vent cover (10) and the side plates (205) of the housing to seal the gap between the vent cover (10) and the housing.

The lower segment (23) has a front plate (231). At least one entrance (22) is defined in the front plate (231) for the air to enter the housing. A fan (24) is secured in the lower segment (23) of the hollow housing and faces the entrances (22) in the front plate (231). An air tunnel (27) is defined between the upper segment (21) and the lower segment (23) for air to flow into the upper segment (21) from the entrances via the air tunnel (27).

In operation, the air is led into the housing by the fan (24) through the entrances (22) in the front plate (231). The air then passes through the air tunnel (27) and flows into the upper segment (21). When the air passes through the treatment element (26), the condition of the air will be changed. For example, if the treatment element (26) is a heat exchanger, the temperature of the air will be changed. If the vent cover (10) attached to the housing is a laminar-flow vent cover (10) as shown in FIGS. 1 and 3, the air will be diffused from the vents (122) in the front face (12) of the vent cover (10). With the enlarged openings of the vents (122), the speed of airflow is slow. Whereby the air treatment apparatus (20) with a laminar-flow vent cover (10) can change the condition of the air in a specific area.

If the vent cover (10) attached to the housing is a jet-flow vent cover (10) as shown in FIGS. 2 and 4, the air will be diffused from the vents (142) in the top face (14) of the vent cover (10). With the narrow vents (142), the speed of airflow is high, and the dispersal distance of the airflow is longer than that of the airflow diffused from the vents (122) in the laminar-flow vent cover (10) as shown in FIGS. 1 and 3. Thus, the air treatment apparatus (20) with a jet-flow vent cover (10) can be used to change the condition of the air in a large area. Because the vent cover (10) is attached to the housing by a detachable fastening means, the vent cover (10) is detachable from the housing. Consequently, if the user wants to change the form of the airflow diffused from the air treatment apparatus (20), the user just replaces the vent cover (10) with another. The cost for a consumer achieving different airflows is reduced by having only one apparatus which can be fitted with interchangeable covers. In addition, for a manufacturer, the cost of designing and manufacturing one type of apparatus (20) that can be fitted with two types of vent covers (10) is much less than that of designing and manufacturing two different types of apparatuses (20) each fitted with a different type of vent cover (10). Thus, the cost for manufacturing the air treatment apparatus (20) is reduced when compared with the prior art.

With reference to FIGS. 5 to 8, the vent covers (10) shown in FIGS. 1 and 2 can be also applied to different types of air treatment apparatuses (30, 40). Wherein, the entrances of the apparatus (30, 40) are defined in the rear plate of the housing. The fan of the air treatment apparatus (40) shown in FIGS. 7 and 8 can be a cross fan.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An air treatment apparatus comprising:
    a housing having an upper segment with a treatment element and a lower segment having a front plate with at least one entrance defined in the front plate;
    a fan secured in the housing and facing the at least one entrance in the plate; and
    a vent cover with at least one vent detachably and interchangeably attached to the housing,
    wherein the upper segment of the housing comprises:
        a rear plate:
        a top plate vertically extending from a top of the rear plate;
        two side plates respectively and vertically extending from two opposite sides of the rear plate to define an opening between the rear plate, the top plate and the side plates to receive the treatment element and to attach the vent cover in the opening;
        a first inclined edge is formed on a free end of each side face of the vent cover;
        a first vertical edge is formed on a free end of each side face of the vent cover and above the inclined edge;
        a second inclined edge is formfed on a free end of each side plate of the housing and corresponds to the first inclined edge on one of the side faces of the vent cover; and
        a second vertical edge is formed on a free end of each side plate of the housing and corresponds to the first vertical edge on one of the side faces of the vent cover.

2. The air treatment apparatus as claimed in claim 1, wherein the vent cover comprises:
    a front face;
    a top face vertically extending from a top of the front face; and
    two side faces respectively and vertically extending from two opposite sides of the front face.

3. The air treatment apparatus as claimed in claim 2, wherein the at least one vent is defined in the front face of the vent cover.

4. The air treatment apparatus as claimed in claim 2, wherein the at least one vent is defined in the top face of the vent cover.

5. The air treatment apparatus as claimed in claim 1, wherein the each at least one vent has an enlarged opening.

6. The air treatment apparatus as claimed in claim 1, wherein the each at least one vent has a width much smaller than a length of the each at least one vent.

7. The air treatment apparatus as claimed in claim 1, wherein the air treatment apparatus further comprises an air tunnel defined between the upper segment and the lower segment.

8. The air treatment apparatus as claimed in claim 1, further comprising an airtight pad mounted between the side faces of the vent cover and the side plates of the housing.

9. An air treatment apparatus comprising:

a housing having at least one entrance, a fan secured in the housing and facing the at least one entrance in the front plate and a treatment element received in the housing; and a vent cover with at least one vent detachably and interchangeably attached to the housing, wherein the vent cover comprises:
a front face;
a top face vertically extending from a top of the front face; and
two side faces respectively and vertically extending from two opposite sides of the front face;
a first inclined edge is formed on a free end of each side face of the vent cover;
a first vertical edge is formed on a free end of each side face of the vent cover and above the inclined edge;
a second inclined edge is formed on a free end of the housing and corresponds to each respective first inclined edge on the vent cover; and
a second vertical edge is formed on a free end of the housing and corresponds to each respective first vertical edge on the vent cover.

10. The air treatment apparatus as claimed in claim 9, wherein the at least one vent is defined in the front face of the vent cover.

11. The air treatment apparatus as claimed in claim 9, wherein the at least one vent is defined in the top face of the vent cover.

12. The air treatment apparatus as claimed in claim 9, wherein the at least one vent has an enlarged opening.

13. The air treatment apparatus as claimed in claim 9, wherein the each at least one vent has a width much smaller than a length of each at least one vent.

14. The air treatment apparatus as claimed in claim 9, wherein an air tunnel is defined between the fan and the treatment element.

15. The air treatment apparatus as claimed in claim 9, further comprising an airtight pad mounted between the side faces of the vent cover and the housing.

16. The air treatment apparatus as claimed in claim 9, wherein the treatment element is a filter.

* * * * *